US008583815B2

(12) United States Patent
Devillers

(10) Patent No.: US 8,583,815 B2
(45) Date of Patent: Nov. 12, 2013

(54) METHOD OF GENERATING A FILE DESCRIBING A BITSTREAM, CORRESPONDING DEVICE AND COMPUTER PROGRAM PRODUCT

(75) Inventor: Sylvain Devillers, Paris (FR)

(73) Assignee: France Telecom, Paris (FR)

( * ) Notice: Subject to any disclaimer, the term of this patent is extended or adjusted under 35 U.S.C. 154(b) by 390 days.

(21) Appl. No.: 12/294,755

(22) PCT Filed: Mar. 27, 2007

(86) PCT No.: PCT/FR2007/051026

§ 371 (c)(1), (2), (4) Date: Jun. 29, 2009

(87) PCT Pub. No.: WO2007/110550

PCT Pub. Date: Oct. 4, 2007

(65) Prior Publication Data

US 2010/0281177 A1 Nov. 4, 2010

(30) Foreign Application Priority Data

Mar. 28, 2006 (FR) ..................................... 06 02689

(51) Int. Cl.
*G06F 15/16* (2006.01)

(52) U.S. Cl.
USPC ........................................... 709/231; 709/203

(58) Field of Classification Search
USPC ......... 709/223, 224, 227, 228, 229, 231, 238, 709/203, 232, 233, 234, 235
See application file for complete search history.

(56) References Cited

U.S. PATENT DOCUMENTS

| | | | | |
|---|---|---|---|---|
| 7,809,851 | B2 * | 10/2010 | Klemets | 709/231 |
| 7,870,125 | B1 * | 1/2011 | Istvan et al. | 707/722 |
| 2005/0076136 | A1 * | 4/2005 | Cho et al. | 709/231 |
| 2005/0262187 | A1 * | 11/2005 | Klemets | 709/203 |

OTHER PUBLICATIONS

De Schrijver D et al., "MPEG-21 bitstream syntax descriptions for scalable video codecs", Multimedia Systems, Feb. 8, 2008, pp. 403-421, vol. 11(5).
Sylvain Devillers, "An Extension of BSDL for Multimedia Bitstream Syntax Descrption," Springer-Verlag Berlin Heidelberg, 2003.
Sylvain Devillers et al., "Bitstream Syntax Description-Based Adaptation in Streaming and Constrained Environments," IEEE Transactions on Multimedia, Jun. 2005, pp. 463-470, vol. 7, No. 3.
Written Opinion of Counterpart Application No. PCT/FR2007/051026 filed Mar. 27, 2007.

(Continued)

*Primary Examiner* — Barbara Burgess
(74) *Attorney, Agent, or Firm* — David D. Brush; Westman, Champlin & Koehler, P.A.

(57) ABSTRACT

A method, corresponding device and computer program product are provided for generating a file describing a bit stream, from a description scheme describing a structure and a content that are compliant with a predetermined format and comprising a set of attributes and elements. The bit stream includes a plurality of fields. The method includes: assigning at least one value of at least one identified filed of the stream to at least one variable defined by an attribute of the description scheme, called assignment attribute; storing the variable; determining at least one characteristic of at least one element of the description file, from and evaluation of a conditional expression relating to the value; generating a portion of the description file according to the characteristics determined in the determination step.

13 Claims, 2 Drawing Sheets

(56) References Cited

OTHER PUBLICATIONS

French Search Report for French Application No. FR06/02689, filed Mar. 28, 2006.

ISO/IEC JTC1/SC29/WG11 MPEG2005/M12217, "Context-related attributes for MPEG-21 BSDL," Davy De Schrijver, Wesley De Neve, and Rik Van de Walle, Jul. 2005, Pozan, Poland.

International Search Report of Counterpart Application No. PCT/FR2007/051026 filed Mar. 27, 2007.

* cited by examiner

METHOD OF GENERATING A FILE DESCRIBING A BITSTREAM, CORRESPONDING DEVICE AND COMPUTER PROGRAM PRODUCT

CROSS-REFERENCE TO RELATED APPLICATIONS

This Application is a Section 371 National Stage Application of International Application No. PCT/FR2007/051026, filed Mar. 27, 2007 and published as WO 2007/110550 on Oct. 4, 2007, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of digital communications and especially communications via the Internet.

The disclosure relates to the instantiation of parameters during the syntactic analysis of a bitstream formed by a plurality of fields and more specifically the instantiation of a description of this bitstream.

The disclosure can be applied especially but not exclusively to the syntactic analysis of a multimedia bitstream, and finds application especially in the matching of scalable multimedia contents to be transmitted to a recipient according to the profile of the user (the screen, computation capacity, storage capacity, links used for transmission etc). Such matching is used especially to avoid the unnecessarily transmission of data that cannot not be used by the recipient and therefore to save on bandwidth.

It must be specified especially that throughout the document here below, the term "multimedia content" is understood to mean an audio, video, image or other type of bitstream.

The disclosure can be applied especially in BSDL (Bitstream Syntax Description Language) as described in the ISO/IEC 21000-7 (MPEG-21 Part 7: Digital Item Adaptation) standard.

More specifically, the BDSL language is an extension of the XML Schema (extensible mark-up language schema), specified by the W3C (World Wide-Web consortium). The XML Schema recommendation dated October 2004 is available especially at the Internet site http://www.w3.org/TR/xmlschema-1/and xmlschema-2/. Thus, BSDL defines an XML syntax to describe the syntax of a bitstream according to a given format.

BACKGROUND OF THE DISCLOSURE

1. Prior Art 1.1 BSDL Language

For the sake of simplicity and clarity, a detailed description is given here below solely of the prior art pertaining to the use of BSDL language to describe the syntax of a bitstream.

Referring to FIG. 1, an example is recalled of the use of BSDL language to generate an adapted bitstream 12 from a source bitstream 11.

To this end, as indicated here above, the BSDL defines an XML syntax to describe the syntax of a bitstream compliant with a given format. This description is called a "Bitstream Syntax Description" or BSD.

More specifically, the description file for the source bitstream 11, referenced source BSD 14, is obtained by using a first processor 13, called BintoBSD used to parse the source bitstream 11 and instantiate its description.

The XML description file for the source bitstream is then converted into another XML description file, called a converted BSD 17, by using the XSLT (extensible Style sheet Language Transformation) language 16.

The adapted bitstream 12 is then obtained by using a second processor 18 called a BSD to Bin enabling the transformed BSD description 17 to be read and the corresponding adapted bitstream 12 to be generated.

To this end, these two processors BintoBSD 13 and BSD to Bin 18 use a XML document called a "Bitstream Syntax Schema" or BS Schema 15 which defines the structure of the given format and the types of fields defined by this format.

A more precise description is given here below of the working of the first BintoBSD processor 13 enabling the reading of a bitstream and the generation of its BSD description file.

It can be recalled especially that this process is gradual. This means that a current point of the bitstream (in other words at an instant t in the reading of the bitstream), all the fields already read are described by the partially instantiated BSD description file.

Here below in the document, the term "downstream" refers to that part of the bitstream that has already been read (and therefore already described in the partially instantiated BSD description) and the term "upstream" refers to the part that has not yet been read.

More specifically, during the bitstream reading process, it is common for the type, the number of occurrences and/or the size of a field of the bitstream, inter alia, to be determined by the value of another field present downstream or upstream in the bitstream.

According to the prior art, the BSDL language defines two ways of referencing a field of this kind depending on whether it is located downstream or upstream to the current position in the bitstream.

1. When a field of this kind is situated downstream from the current field, it has already been read and the value of this downstream field is therefore present in the partially instantiated BSD description file. The BSDL language is therefore used to reference an XML element corresponding to this field. To this end, BSDL uses the XPath language as described in a recommendation of the W3C dated November 1999 (XML Path Language, Version 1.0, W3C Recommendation 16, available on the Internet site http://www.w3.org/TR/xpath), and more specifically the path for locating the XML element corresponding to this field. It may be recalled that the XPath language is an expression language enabling the specification of an expression that brings into play arithmetic and logic operators, functions, constants, variables and location paths. A location path referenced "LocationPath", thus enables the location of a set of nodes such as elements and attributes in an XML document. Thus, when a path of this kind is situated downstream from the current field, BSDL uses the XPath location paths to reference an element in the partially instantiated BSD.
2. When a field of this kind is located upstream to the current field, it is not yet present in the partially instantiated BSD description file. The field is then referenced by its location in bitstream. It may be recalled that, in this case, the field present upstream is generally situated in the vicinity of the current position in the bitstream, and is therefore present in the read buffer.

The BSDL language then makes it possible to specify several types of use of a field depending on whether it is situated upstream or downstream relative to the current position of the reading of the bitstream.

For example, the BSDL enables the value of a downstream field to be used in order to specify especially:

the number of occurrences of an element corresponding to a field to be read, which corresponds to the number of times that this field must be read in the bitstream;

the size of a field to be read;

the type of a field to read;

etc.

To this end, BSDL uses the XPath expression which can include a reference to one or more fields situated downstream through their location path. This XPath expression is assessed with reference to the elements created in the partial BSD and its evaluation can, as the case may be, give a Boolean value (true or false), or an integer.

When the field is upstream, the possibilities of use are on the contrary far smaller in these prior art techniques As it happens, BSDL uses the upstream field only to decide on whether or not to instantiate an element. Thus, the attribute bs2: if Next applied to the declaration of an element in the XML document "BS Schema" (15), possibly combined with the attributes bs2: lookAhead and bs2: iNextMask, specifies that the element to which the attribute refers is instantiated if and only if the upstream field has a predetermined value.

1.2 Drawbacks of the Prior Art

Unfortunately, the technique currently used for the instantiation of a description file for a bitstream suffers from two main drawbacks.

Thus, for the use of fields of the bitstream situated downstream from a current position during the reading of the stream, the BSDL language relies on the use of the Xpath location path to reference these fields, as described here above. Now, to be able to assess this XPath location field, the BintoBSD processor 13 must store the partially instantiated BSD description file in its memory. Now, it must be noted that the size of this description file increases during the reading of the bitstream.

One major drawback of this prior art technique for the downstream fields therefore comes from memory consumption which may become prohibitive when the bitstream is big and especially so when the bitstream is generated continuously. This is the case for example in a continuously encoded video program (video encoded on the fly).

Indeed, the high consumption of memory resources may especially cause deterioration in the performance of the instantiation technique, or even cause it to fail.

Furthermore, for the use of fields of the bitstream situated upstream relative to a current position during the reading of the stream, the BSDL language limits the use of these fields to a test on the instantiation of the element.

One major drawback of this prior art technique for downstream fields is that they do not take account of the characteristics of the field to be read, for example its size, determined by a upstream field. It is indeed not possible to specify these characteristics with the BSDL language in this prior art technique.

1.3 Alternative Prior Art Approaches

To overcome the drawback related to high memory consumption in the storage of the partial BSD for downstream fields, one alternative solution has been proposed by the University of Ghent in the contribution MPEG M12217 (ISO/IEC JTC1/SC29/WG11 MPEG2005/M12217, "*Context-related attributes for MPEG-21 BSDL*", Davy De Schrijver, Wesley De Neve, and Rik Van de Walle, July 2005, Poznan, Poland).

This approach can be used especially to memorize only one part of the BSD description file needed to assess XPath expressions.

However, this approach has many drawbacks.

Thus, this prior art solution always requires that a part of the BSD be saved (in practice, classically, a sub-tree). This consumes memory unnecessarily whereas only the values of some elements of this sub-tree are used by the XPath expression.

Furthermore, the downstream fields are always referenced by an XPath location path, the evaluation of which uses computation resources.

Finally, this prior art technique cannot be used to cope with the drawbacks related to the limitation of the use of the fields situated upstream with respect to a test on the instantiation of the element.

SUMMARY

An aspect of the disclosure relates to a method for the generation of a file describing a bitstream from a description schema describing a structure and a content compliant with a predetermined format and comprising a set of attributes and elements, said bitstream being formed by a plurality of fields.

According to an embodiment of the invention a method comprises:

a step for assigning at least one value of at least one identified field of said stream to at least one variable defined by an attribute of said description schema, called an assignment attribute;

a step for storing said at least one variable;

a step for determining at least one characteristic of at least one element of said description file from an evaluation of a conditional expression relating to said at least one value;

a step for generating a portion of said description file as a function of said characteristic or characteristics determined during said determining step.

Thus, an embodiment of the invention relies on a wholly novel and an inventive approach to the generation of a description file where in at least one variable is defined in the description schema, this variable carrying the value of a field identified in the bitstream by means of an attribute of the description schema.

This identified field may correspond especially to a field situated downstream or upstream relative to a field to be read of the bitstream, relative to the sense in which the bitstream is read.

Thus, according to an embodiment of the invention, this variable is memorized so that it can then determine characteristics of the field to be read, in other words, characteristics of the element of the description file corresponding to the field to be read.

Thus there is an optimizing of the consumption of memory resources and processing time on the part of a processor implementing the generation method according to an embodiment of the invention in referencing the values of certain fields situated upstream and downstream of a field to be read in variables, and in using the values stored in these variables to determine certain characteristics of the field to be read.

It can be noted especially that the technique proposed is a generic one since it is independent of the encoding format used: it is the description schema that defines the structure and content of the bitstream, according to a predetermined format.

According to one particular characteristic, the assignment attribute comprises at least one parameter comprising at least said variable.

Each parameter thus has at least one variable in which the value of an identified field of the bitstream is stored. The value of an identified field is therefore memorized and referenced by the name of this variable.

According to one particular embodiment, it is considered especially that:

- a parameter of an assigning attribute comprises solely the variable in which the value of an identified field is stored, when the identified field is situated downstream from a field to be read, and
- a parameter of an assigning attribute comprises the variable in which the value of an identified field and at least one piece of information on the location of an upstream field are stored, when the identified field is situated upstream to a field to be read.

According to this embodiment, when an identified field corresponds to a field situated upstream to a field to be read of the bitstream relative to the sense of reading of the bitstream, at least one parameter of an assignment attribute comprises a triplet comprising said variable and at least two informations on identification belonging to the group comprising at least:

- a start-of-field position in said bitstream,
- an end-of-field position in said bitstream,
- a field length in said bitstream, said information on identification enabling said identified field to be identified.

Each parameter therefore has a triplet carrying two values which can be used especially to identify the address of the upstream field in the bitstream and one variable to store the value of this field. The upstream field is therefore read and its value is stored in a storage memory referenced as a variable.

For example, the identified field corresponds to a field that begins at said starting position and presents said field length, or a field that begins at said starting position and ends at said end position, etc.

When an identified field corresponds to a field situated downstream from a field to be read of the bitstream relative to the sense in which the bitstream is read, said identified field corresponds to a field being read in said bitstream.

The value of the downstream field is therefore stored immediately after it has been read and is referenced as a variable.

In particular, the evaluation step refers to said variable in the description schema.

Said variable is therefore directly called by its name in order to retrieve the value of an identified field and use this value to test a conditional expression determining certain characteristics of at least one element of the description file.

For example, said at least one characteristic belongs to the group comprising at least:

- a type of an element;
- a length of an element;
- a number of occurrences of an element.

It can be noted especially that the number of occurrences of an element may be equal to 0. It is thus possible to test for the presence or absence of an element.

According to one particular characteristic of the invention, the bitstream is a scalable multimedia stream. An embodiment of the invention can thus be applied for example to the adaptation of scalable multimedia contents.

According to one particular embodiment, the description file is of the Bitstream Syntax Description type and said description schema is of the Bitstream Syntax Schema type according to the MPEG-21 Part 7 standard. Thus, the BSDL language is used to describe the syntax of a bitstream.

In another embodiment, the invention relates to a device for the generation of a file describing a bitstream from a description schema describing a structure and a content compliant with a predetermined format and comprising a set of attributes and elements, said bitstream being formed by a plurality of fields.

This device comprises:

- means of assigning at least one value of at least one identified field of said stream to at least one variable defined by an attribute of said description schema, called an assignment attribute;
- means of storing said at least one variable;
- means of determining at least one characteristic of at least one element of said description file from an evaluation of a conditional expression relating to said at least one value;
- means of generating a portion of said description file as a function of said characteristic or characteristics determined during said determining step.

Such a device is adapted especially to implementing the method for generating a file for describing a bitstream as described here above.

Another aspect of the invention relates to a computer program product downloadable from a communications network and/or recorded on a computer-readable carrier and/or executable by a processor, comprising program code instructions for the execution of the steps of the method for generating a description file as described here above, when the program is executed on a computer.

BRIEF DESCRIPTION OF THE DRAWINGS

Other features and advantages shall appear more clearly from the following description of a particular embodiment, given by way of a simple illustrative and non-exhaustive example, and from the appended drawings, of which FIG. 1, commented upon referred to with reference to the prior art, shows an example of use of the BSDL language to generate a bitstream adapted from a source bitstream.

DETAILED DESCRIPTION OF ILLUSTRATIVE EMBODIMENTS

Figure 1:
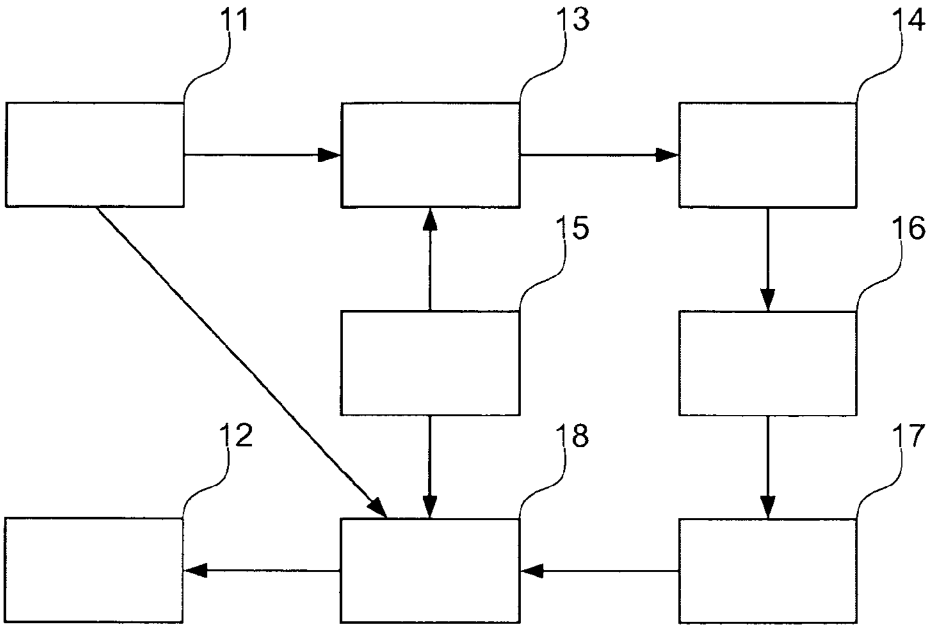

1. Description of a Embodiment of the Invention

1.1 General Principle

An embodiment of the invention enables the generation of a file describing a bitstream from the syntactic analysis of the bitstream and description schema.

It may be recalled especially that a schema of this kind is used to define the structure of a given format and the types of fields defined by this format. The solution proposed is therefore independent of the encoding format since this format is given by the description schema.

The general principle of an embodiment of the invention relies on the use, in the description schema, of at least one assignment attribute comprising one or more parameters each comprising at least one variable, in which the value of an identified field of the bitstream is stored. The value of this identified field is used especially to determine a characteristic of an element of the description file corresponding to a field to be read of the bitstream.

For example such an assignment attribute is written as "AssignPost" when at least one characteristic of a field to be read is determined by the value of another field that is present downstream in the bitstream called a downstream field and "AssignPre" when at least one characteristic of a field to be read is determined by the value of another field present upstream in the bitstream called an upstream field.

It may be recalled that the term "characteristic" is used here to mean the type, number of occurrences, size etc of an element corresponding to a field.

Thus, when a characteristic of an element corresponding to a field of the bitstream to be read is determined by the value of a downstream field, the downstream field of the bitstream is read according to the information carried by a description schema specifying the format of the digital stream, the value read is assigned to a variable (referenced by a name) and this value is used to test an expression determining at least one characteristic of an element of the description file corresponding to the field to be read.

When a characteristic of an element corresponding to a field of the bitstream to be read is determined by the value of an upstream field, the upstream field or fields of the stream identified are read (for example by their position in the bitstream), the value or values read are assigned to one or more variables (referenced by a name), and this value or values are used to test an expression determining at least one characteristic of an element of the description file corresponding to the field to be read.

An embodiment of the invention can thus be used, in at least one particular embodiment, to overcome certain drawbacks of the prior art, and especially to limit the memory consumption required by the syntactic analysis of the bitstream and the instantiation of the XML description of this stream.

In other words, an embodiment of the invention proposes an approach enabling the referencing of fields situated upstream and downstream in optimizing the consumption of the memory and processing time and the use of the value of these fields during the reading of bitstream to determine at least one characteristic of a field to be read according to at least one embodiment.

1.2 Use of the BSDL Language

A description is provided here below of a particular embodiment of the invention pertaining to the use of BSDL language to describe the syntax of a multimedia bitstream.

Naturally, this example is not restrictive and the principles of the invention described here below in detail may be implemented in using other languages.

In the context of the use of the BSDL, the embodiment of the invention described here in relates to the part of the language called BSDL-2 corresponding to the BintoBSD processor as presented with reference to the prior art, enabling the reading of a bitstream and the instantiation of its description.

Thus, for the sake of clarity, the description here below uses a notation comprising a prefix to reference an element of XML syntax specified in a given space of names:

- the prefix bs2: is thus used to qualify an element of syntax defined by BSDL-2;
- the prefix bs1: to qualify an element of syntax defined by BSDL-1; and
- the prefix xs: to qualify an element of syntax defined by XML Schema.

As indicated here above, the general principle of an embodiment of the invention relies on the use, in the description schema, of at least one assigning attribute comprising one or more parameters. These parameters are declared in the BS Schema and are instantiated in two different ways depending on whether the characteristics of an element corresponding to a field to be read are determined in a field situated upstream and downstream of the field to be read.

Thus, in a first case, the parameter is associated with a field of the bitstream situated downstream from the field to be read, referenced "downstream field". This parameter has at least one variable that can used especially to store the value of this downstream field. The value of the downstream field is therefore memorized immediately after it has been read and referenced by the name of the variable. It is therefore not necessary, in this particular embodiment of the invention, to save the entire sub-tree representing the partially instantiated BSD description file to be able to reference the value of this downstream field through an XPath location path as is necessary in the prior art.

In a second case, the parameter is associated with a field of the bitstream situated upstream from the field to be read, referenced "upstream field". In this case, an assigning attribute of the description schema comprises one or more parameters, each carrying a variable and at least two pieces of identifying information, assembled in the form of a triplet. Each parameter therefore has one triplet carrying two values used especially to identify the address of the upstream field in the bitstream and one variable used to store the value of this field. The upstream field is therefore read and its value is stored in a storage memory referenced by the name of the variable.

In both cases, once the downstream field or upstream field has been read, the variable storing the value of the field can then be used in an XPath expression specifying the characteristics (number of occurrences, type, size, etc) of an element corresponding to the field to be read.

A) Downstream Case According to the Prior Art

Here below, referring to FIG. 2 and appendix 1, which is an integral part of the description, we present a technique for the syntactic analysis of a multimedia bitstream and for the generation of a description file (BSD) of the prior art.

It can be specified especially that in the appendices 1, 2 and 3 having examples of XML documents (description schemas and BSD description files), the comments are in italics and framed by characters such as the following "<!—" and "—>".

Figure 2:
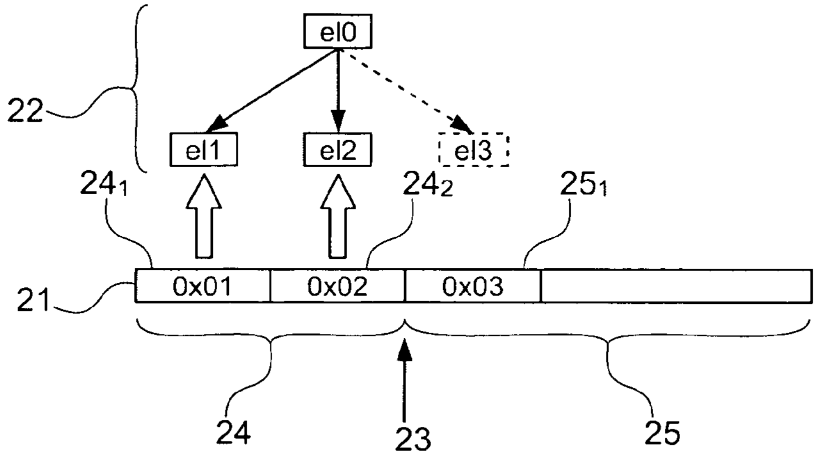
FIGS. 2 and 3 each illustrate a bitstream and the representation of the associated BSD description file in the form of a sub-tree.

More specifically, FIG. 2 illustrates an example of a bitstream 21 and the representation of the associated partial BSD description file in the form of a sub-tree 22.

In this example, the bitstream 21 successively carries the values 0x01, 0x02, 0x03, etc.

The arrow 23 indicates the position of the reading of the bitstream at a given instant t.

Thus, as indicated here above, the fields 24 correspond to the part of the bitstream already read, qualified as a downstream part, and the fields 25 correspond to the part of the stream that is not yet been read, qualified as a upstream part.

More specifically, the format of this stream indicates that this stream contains one-byte-long fields $\mathbf{24}_1$ and $\mathbf{24}_2$ and optionally a third field $\mathbf{25}_1$ which is present if and only if the value of the first field $\mathbf{24}_1$ is equal to 1.

Thus, the description schema (Bitstream Syntax Schema or BS Schema) presented in appendix 1, part A, specifies this format in BSDL in declaring three elements el1, el2 and el3 of the xs: unsignedByte type, the element el3 being optional (its number of occurrences could be equal to 0):

```
<xs:element name="el1" type="xs:unsignedByte"/>
<xs:element name="el2" type="xs:unsignedByte"/>
<xs:element name="el3" type="xs:unsignedByte" minOccurs="0"
        bs2:if="/el0/el1 = 1"/>
```

The attribute b2: if contained in the declaration of the element el3 specifies the condition of the occurrence of this element by the XPath expression "/el0/el1=1". This XPath expression uses especially the location path "/el0/el1" which references the element el1.

In this prior art technique, the processor BintoBSD therefore reads the bitstream according to the information given by the BS Schema as presented in appendix 1, part A: it reads the two fields $\mathbf{24}_1$ and $\mathbf{24}_2$ having a length of one byte and instantiates the corresponding elements el1 and el2 in the BSD description file.

It can be recalled especially that the text content of these elements is equal to the values of the fields.

Appendix 1, part B, also presents the BSD partial description file of the bitstream as instantiated after the processor BintoBSD has read the first two fields $\mathbf{24}_1$ and $\mathbf{24}_2$ according to this example. To know if it should read the third field corresponding to el3, the processor BintoBSD must then evaluate the XPath expression "/el0/el1=1" relative to this partial description.

It is therefore noted that to perform this test, the processor BintoBSD must memorize the partially instantiated BSD.

B) "Downstream" Case According to an Embodiment of the Invention

Referring now to FIG. 2 and appendix 2, which is an integral part of the description, we present a technique for the syntactic analysis of a multimedia bitstream which is advantageously scalable and for the generation of a (BSD) description file according to a particular embodiment of the invention.

It is considered especially in this case that a characteristic of the field of the bitstream to be read $\mathbf{25}_1$ (specification of the occurrence of an element for example) is determined by the value of at least one field present downstream in the bitstream, called a downstream field, for example the field $\mathbf{24}_1$.

More specifically, in this particular embodiment of the invention, during the declaration of the three elements el1, el2 and el3 in the description schema presented in appendix 2, part A (which is equivalent to the prior art description schema presented in appendix 1, part A), a piece of information is added to the declaration of the element el1 in the form of an assigning attribute bs2: assignPost which tells the processor BintoBSD that it must store the value of the downstream field after having read it and store it as the variable par1.

Thus the declaration of the three elements el1, el2 and el3 is done as follows:

```
<xs:element name="el1" type="xs:unsignedByte"
bs2:assignPost="par1"/>
<xs:element name="el2" type="xs:unsignedByte"/>
<xs:element name="el3" type="xs:unsignedByte" minOccurs="0"
        bs2:if="$par1 = 1"/>
```

Thus, in this example, the assignment attribute assignPost has only one parameter used to assign a variable named par1 to the element el1 of the description schema and store the value of the downstream field in this variable par1 after having read it.

According to this embodiment, the attribute bs2: assignPost therefore has a parameter comprising the name of the variable which will be subsequently referenced.

The XPath expression used by the attribute bs2: if in the declaration of the element el3 is then replaced by the expression: "$par1=1".

It may be recalled that the syntax $par1 in the XPath language references the variable named par1. Indeed, XPath defines a syntax to reference a variable in the form $name. The expression used to specify the condition of occurrence of the element el3 is therefore always compliant with the XPath language. This enables a processor compliant with the XPath to evaluate it.

It can thus be seen that to evaluate this expression XPath, the BintoBSD processor no longer needs to store the partial BSD represented, but only the value of the field $\mathbf{24}_1$ under the reference $par1.

Appendix 2, part B also presents another example of a description schema in which the expression XPath specifies a constraint on the number of occurrences of an element.

The declaration of the elements is the same as described here above but the description schema indicates that the processor BintoBSD must instantiate the element el3 for a number of times equal to the value of the variable par1 plus one:

```
<xs:element name="el1" type="xs:unsignedByte"
bs2:assignPost="par1"/>
<xs:element name="el2" type="xs:unsignedByte"/>
<xs:element name="el3" type="xs:unsignedByte" minOccurs="0"
        bs2:nOccurs="$par1 + 1" maxOccurs="unbounded"/>
```

Finally, appendix 2, part C, presents another example of a description schema in which the XPath expression specifies a constraint on the type of an element.

Again, the declaration of the elements el1, el2 and el3 is the same as described here above but the description schema states that the type of the element el3 (namely hexadecimal) must have a length equal to the value of the variable par1 plus one. The processor BintoBSD will therefore read a number of bytes for the element el3 specified by the expression:

*bs2*:length value="$*par*1+1"

C) Upstream case According to an Embodiment of the Invention

Figure 3:
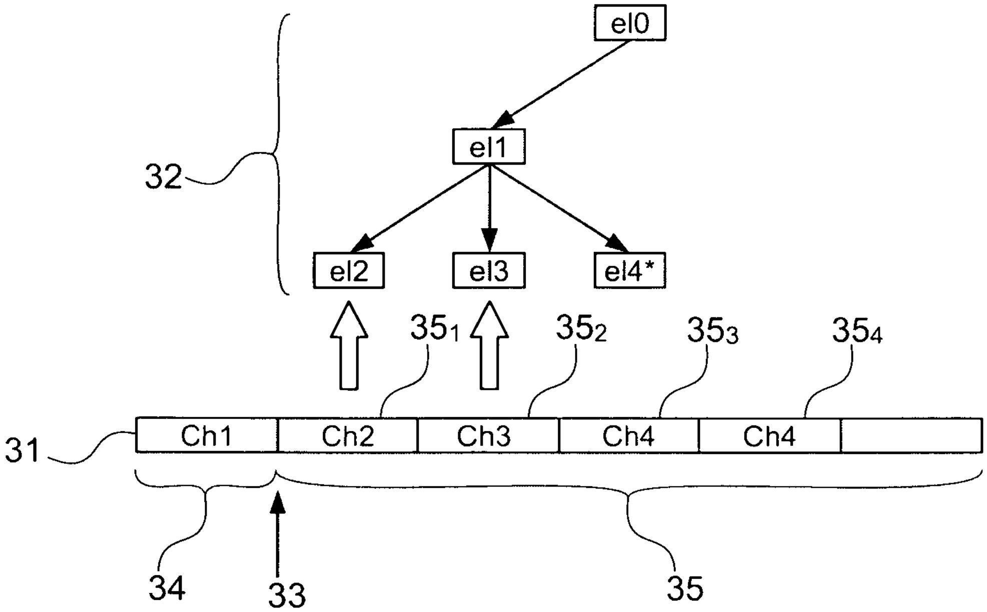

Referring now to FIG. 3 and appendix 3 which is an integral part of the description, we present a technique for the syntactic analysis of a multimedia bitstream that is advantageously scalable and for the generation of a (BSD) description file according to a particular embodiment of the invention in considering it to be the case that a characteristic of the field of the bitstream to be read is determined by the value of at least one field present upstream in the bitstream.

More specifically, FIG. 3 illustrates an example of a bitstream 31 and the representation of the associated partial BSD description file in the form of a sub-tree 32. The arrow 33 indicates the position of the reading of the bitstream at a given instant t.

As indicated here above, the field 34 corresponds to a part of the already read stream called a downstream part and the fields 35 ($35_1$, $35_2$, $35_3$, $35_4$) correspond to a apart of the stream that has not yet been read called an upstream part.

Appendix 3 gives an example of a description schema in which two fields situated upstream define a condition on the instantiation and type of element el1:

```
<xs:element name="el1" bs2:assignPre="par2 0 32 par3 32 32"
        bs2:if="$par3 = 'ftyp'" minOccurs="0">
    <xs:complexType bs2:layerLength="$par2">
```

More specifically, in this example, the assignment attribute assignPre has two parameters ("par 2 0 32" and "par 3 32 32"), each comprising a triplet that respectively indicate the name by which the variable carrying the value of the upstream field is referenced, the position in terms of number of bits relative to the current point and the length of the upstream field carrying information on the field to be read (name, start, length).

Thus, each triplet enables the assignment of a variable named par2 (or par3 respectively) to an element of the description schema, the identification of an upstream field situated 0 bits (and 32 bits respectively) upstream to the arrow 33 and having a length of 32 bits (and 32 bits respectively) and the storage in this variable par2 (and par3 respectively) of the value of the upstream field after it has been read.

In other words, according to this embodiment of the invention, the processor BintoBSD starts by initially reading the two fields of the bitstream identified by the attribute bs2: assignPre when it tries to instantiate the element el1 and stores the values of these fields in variables par2 and par3.

In a second stage, the processor evaluates the XPath expression contained in the attribute bs2: if to verify that that it must instantiate the element el1. The attribute bs2: if therefore specifies a condition so that the element el1 is instantiated.

This condition relates to the value of an upstream field which is situated 32 bits after the current point (arrow 33) and has a length of 32 bits. This field must be equal to the sequence of bytes represented by the sequence of four characters 'ftyp'. A test is made therefore on the value of the variable par3.

If the condition is fulfilled, then the processor instantiates the element el1, and then assesses the XPath expression included in the attribute bs2: layerLength. The attribute bs2: layerLength present in the definition of the type (xs: complexType) defines the cumulated size of the sub-elements of the element el1. More specifically, it uses the variable par2 to determine the cumulated size of the sub-elements of the element el1. It can then instantiate the sub-elements el2, el3 and as many sub-elements el4 as the cumulated size of el1 permits.

It can be recalled that the element el1 is of the complex type because it includes sub-elements (it is a node of the tree) while the elements el2, el3 and el4 are of a simple type (they are leaves of the tree).

A mechanism of this kind is necessary in this example when the number of occurrences of the element el4 is in principle not specified in the description schema: the element el1 has as many elements el4 as its cumulated size specified by b2: layerLength permits.

In this example, the reading of the bitstream is done in several layers, a first layer enabling the reading of the entire stream, then a second layer for the element el1, etc. The value of the cumulated size is specified by a 32-bit field situated immediately upstream.

Finally, it is noted that knowledge of the values of the fields identified by the two parameters is necessary at the time of instantiation of the element el1, when the corresponding elements have not yet been read in the BSD description file.

1.3 Structure of the Device for Generating a Description File

Figure 4:
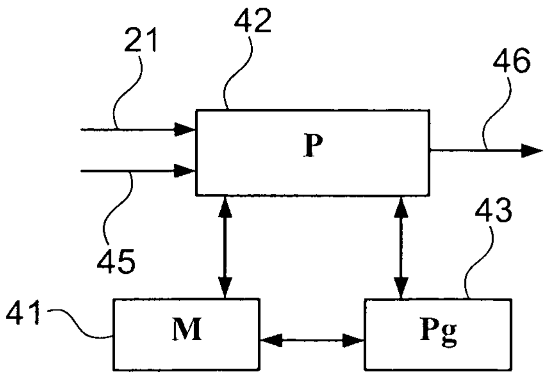
FIG. 4 presents the structure of a device for generating a description file implementing a technique of instantiation of the description of a bitstream according to a particular embodiment of the invention.

Referring now to FIG. 4, we present the simplified structure of a device for generating a description file implementing a technique of instantiation according to the particular embodiment described here above.

Such a generation device comprises a memory 41 a processing unit 42 equipped for example with a microprocessor μP, and driven by the computer program 43 implementing the method for generating a description file according to an embodiment of the invention.

At re-initialization, the code instructions of the computer program 43 are for example loaded into a RAM and then executed by the processor of the central processing unit 42. The central processing unit 42 inputs a bitstream (21, 31) and a description schema 45. The microprocessor of the processing unit 42 implements the steps of the method for generating description file described here above, to determine a BSD description file 46 according to the instructions of the computer program 43.

APPENDIX 1

Prior Art

A. Example of a <<Bitstream Syntax Schema>> Description Schema According to the Prior Art:

```
<?xml version="1.0" encoding="UTF-8"?>
<xs:schema
  xmlns:xs="http://www.w3.org/2001/XMLSchema"
  xmlns:bs1="urn:mpeg:mpeg21:2003:01-DIA-BSDL1-NS"
  xmlns:bs2="urn:mpeg:mpeg21:2003:01-DIA-BSDL2-NS"
  elementFormDefault="qualified"
  bs2:rootElement="el1">
  <xs:import namespace="urn:mpeg:mpeg21:2003:01-DIA-BSDL1-NS"
          schemaLocation="../SchemasFDIS/BSDL-1-
          SoPDAM2.xsd"/>
  <!-- The line here below declares the element el0 -->
  <xs:element name="el0">
    <!-- The line here below defines the type of element el0 as
        being a complex type, i.e. containing sub-elements-->
    <xs:complexType>
      <!-- The line here below defines the content model as being
          an ordered sequence of sub-elements. -->
      <xs:sequence>
        <xs:element name="el1" type="xs:unsignedByte"/>
        <xs:element name="el2" type="xs:unsignedByte"/>
        <!-- The line here below declares the element el3 and specifies
            a condition for its occurrence -->
        <xs:element name="el3" type="xs:unsignedByte"
        minOccurs="0"
                bs2:if="/el0/el1 = 1"/>
      </xs:sequence>
    </xs:complexType>
  </xs:element>
</xs:schema>
```

B. Example of an Associated <<Bitstream Syntax Description>> Partial Description File:

```
<?xml version="1.0" encoding="UTF-8"?>
<el0 xmlns:xsi="http://www.w3.org/2001/XMLSchema-instance"
   xsi:noNamespaceSchemaLocation="schema1.xsd">
   <el1>1</el1>
   <el2>2</el2>
</el0>
```

APPENDIX 2

AssignPost Command

A. Example of a <<Bitstream Syntax Schema>> Description Schema Specifying a Constraint on the Occurrence of an Element According to One Embodiment of the Invention:

```
<?xml version="1.0" encoding="UTF-8"?>
<xs:schema
   xmlns:xs="http://www.w3.org/2001/XMLSchema"
   xmlns:bs1="urn:mpeg:mpeg21:2003:01-DIA-BSDL1-NS"
   xmlns:bs2="urn:mpeg:mpeg21:2003:01-DIA-BSDL2-NS"
   elementFormDefault="qualified"
   bs2:rootElement="el1">
   <xs:import namespace="urn:mpeg:mpeg21:2003:01-DIA-BSDL1-NS"
            schemaLocation="../SchemasFDIS/BSDL-1-
            SoPDAM2.xsd"/>
   <xs:element name="el0">
      <xs:complexType>
         <xs:sequence>
            <!-- The line here below declares the element el1 and tells the
               processor BintoBSD to store the value of the element
               once read under the reference par1 -->
            <xs:element name="el1" type="xs:unsignedByte"
            bs2:assignPost="par1"/>
            <xs:element name="el2" type="xs:unsignedByte"/>
            <!-- The line here below declares the element el3 and
               specifies a condition for its occurrence: it must be
               instantiated if and only if the value of the parameter
               par1 is equal to 1 -->
            <xs:element name="el3" type="xs:unsignedByte"
            minOccurs="0"
                  bs2:if="$par1 = 1"/>
         </xs:sequence>
      </xs:complexType>
   </xs:element>
</xs:schema>
```

B. Example of a <<Bitstream Syntax Schema>> Description Schema Specifying a Constraint on the Number of Occurrences of an Element According to One Embodiment of the Invention:

```
<?xml version="1.0" encoding="UTF-8"?>
<xs:schema
   xmlns:xs="http://www.w3.org/2001/XMLSchema"
   xmlns:bs1="urn:mpeg:mpeg21:2003:01-DIA-BSDL1-NS"
   xmlns:bs2="urn:mpeg:mpeg21:2003:01-DIA-BSDL2-NS"
   elementFormDefault="qualified"
   bs2:rootElement="el1">
   <xs:import namespace="urn:mpeg:mpeg21:2003:01-DIA-BSDL1-NS"
            schemaLocation="../SchemasFDIS/BSDL-1-
            SoPDAM2.xsd"/>
   <xs:element name="el0">
      <xs:complexType>
         <xs:sequence>
            <xs:element name="el1" type="xs:unsignedByte"
            bs2:assignPost="par1"/>
```

-continued

```
            <xs:element name="el2" type="xs:unsignedByte"/>
            <!- - The line here below declares the element el3 and
               specifies the number of its occurrences as being equal to
               the value of the parameter par1 plus 1 -->
            <xs:element name="el3" type="xs:unsignedByte"
            minOccurs="0"
                  bs2:nOccurs="$par1 + 1"
                  maxOccurs="unbounded"/>
         </xs:sequence>
      </xs:complexType>
   </xs:element>
</xs:schema>
```

C. Example of a <<Bitstream Syntax Schema>> Description Schema Specifying a Constraint on the Type of an Element According to an Embodiment of the invention:

```
<?xml version="1.0" encoding="UTF-8"?>
<xs:schema
   xmlns:xs="http://www.w3.org/2001/XMLSchema"
   xmlns:bs1="urn:mpeg:mpeg21:2003:01-DIA-BSDL1-NS"
   xmlns:bs2="urn:mpeg:mpeg21:2003:01-DIA-BSDL2-NS"
   elementFormDefault="qualified"
   bs2:rootElement="el1">
   <xs:import namespace="urn:mpeg:mpeg21:2003:01-DIA-BSDL1-NS"
      schemaLocation="../SchemasFDIS/BSDL-1-SoPDAM2.xsd"/>
   <xs:element name="el0">
      <xs:complexType>
         <xs:sequence>
            <xs:element name="el1" type="xs:unsignedByte"
            bs2:assignPost="par1"/>
            <xs:element name="el2" type="xs:unsignedByte"/>
            <!-- The line here below declares the element el3 and
               constrains its type to having a length equal to the value
               of the parameter par1 plus 1 -->
            <xs:element name="el3" >
               <xs:simpleType>
                  <xs:restriction base="xs:hexBinary">
                     <xs:annotation>
                        <xs:appinfo>
                           <bs2:length value="$par1 + 1"/>
                        </xs:appinfo>
                     </xs:annotation>
                  </xs:restriction>
               </xs:simpleType>
            </xs:element>
         </xs:sequence>
      </xs:complexType>
   </xs:element>
</xs:schema>
```

APPENDIX 3

AssignPre Command

Example of a <<Bitstream Syntax Schema>> Description Schema Specifying a Constraint on the Cumulated Size of the Sub-Elements of an Element According to One Embodiment of the Invention:

```
<?xml version="1.0" encoding="UTF-8"?>
<xs:schema
   xmlns:xs="http://www.w3.org/2001/XMLSchema"
   xmlns:bs1="urn:mpeg:mpeg21:2003:01-DIA-BSDL1-NS"
   xmlns:bs2="urn:mpeg:mpeg21:2003:01-DIA-BSDL2-NS"
   elementFormDefault="qualified"
   bs2:rootElement="el1">
   <xs:import namespace="urn:mpeg:mpeg21:2003:01-DIA-BSDL1-NS"
      schemaLocation="../SchemasFDIS/BSDL-1-SoPDAM2.xsd"/>
```

-continued

```
<xs:element name="el0">
  <xs:complexType>
    <xs:sequence>
      <!-- The line here-below declares the element el1 and tells
          the processor BintoBSD to read two fields in the
          bitstream situated respectively 0 and 32 bits upstream,
          with a length of 32 bits and to assign the values read to
          the parameters par2 and par3. Furthermore, it specifies a
          constraint on the occurrence of el1:to be instantiated, the
          value of the parameter par3 must be equal to the string
          of characters 'ftyp'. -->
      <xs:element name="el1" bs2:assignPre="par2 0 32 par3
                        32 32"
                        bs2:if="$par3 = 'ftyp'"
                        minOccurs="0">
        <!- - The line here below specifies the cumulated size of
            the sub- elements of el1, which must be equal to the
            value of the parameter par2 -->
        <xs:complexType bs2:layerLength="$par2">
          <xs:sequence>
            <xs:element name="el2" type="xs:unsignedInt"/>
            <xs:element name="el3" type="xs:unsignedInt"/>
            <xs:element name="el4" type="xs:unsignedByte"
                    maxOccurs="unbounded"/>
          </xs:sequence>
        </xs:complexType>
      </xs:element>
    </xs:sequence>
  </xs:complexType>
</xs:element>
</xs:schema>
```

Although the present disclosure has been described with reference to one or more examples, workers skilled in the art will recognize that changes may be made in form and detail without departing from the scope of the disclosure and/or the appended claims.

The invention claimed is:

1. A method for generation of a description file, said description file describing a bitstream, and said bitstream being formed by a plurality of fields, wherein said method comprises, performing during reading of said bitstream:

using a description schema describing a structure and allowing describing a content compliant with a predetermined format and comprising a set of attributes and elements;

assigning at least one value of at least one identified field of said bitstream to at least one variable defined by an attribute of said description schema, called an assignment attribute, said variable being foreign to said description file;

storing said at least one variable;

determining with a processor at least one characteristic of at least one element of said description file from an evaluation of a conditional expression relating to said at least one value previously stored in said at least one variable; and generating a portion of said description file as a function of said characteristic or characteristics determined during said determining step, wherein said description file describes said bitstream.

2. The method for the generation of a description file according to claim 1, wherein the assignment attribute comprises at least one parameter comprising at least said variable.

3. The method for the generation of a description file according to claim 2, wherein at least one of said parameters comprises a triplet comprising said variable and at least two pieces of information on identification belonging to the group comprising at least:

a start-of-field position in said bitstream, an end-of-field position in said bitstream, a field length in said bitstream, said pieces of information on identification enabling said identified field to be identified.

4. The method for the generation of a description file according to claim 1, wherein the evaluation step makes reference to said variable.

5. The method for the generation of a description file according to claim 1, wherein said at least one characteristic belongs to the group comprising at least:

a type of an element;

a length of an element;

a number of occurrences of an element.

6. The method for the generation of a description file according to claim 1, wherein said bitstream is a scalable multimedia stream.

7. The method for the generation of a description file according to claim 1, wherein the description file is of the Bitstream Syntax Description type and said description schema is of the Bitstream Syntax Schema type according to the MPEG-21 Part 7 standard.

8. The method, according to claim 1, wherein said assignment attribute is a post assignment attribute in which the value that is currently read from the identified field of the bitstream is stored in a computer-readable memory, in the step of storing, and which is used later in the step of generating a portion of said description file.

9. The method, according to claim 1, wherein said assignment attribute is a pre assignment attribute, in which the value, from which the characteristic that is currently used in the step of generating a portion of the description file is determined, has not yet been read from the identified field of the bitstream.

10. A device for generation of a description file, said description file describing a bitstream, and said bitstream being formed by a plurality of fields, wherein said device comprises:

means for using a description schema describing a structure and allowing describing a content compliant with a predetermined format and comprising a set of attributes and elements, and for assigning, during reading of said bitstream, at least one value of at least one identified field of said bitstream to at least one variable defined by an attribute of said description schema, called an assignment attribute, said variable being foreign to said description file;

means for storing said at least one variable;

means for determining, during reading of said bitstream, at least one characteristic of at least one element of said description file from an evaluation of a conditional expression relating to said at least one value previously stored in said at least one variable; and means for generating, during reading of said bitstream, a portion of said description file as a function of said characteristic or characteristics determined during said determining step.

11. A computer program product recorded on a non-transitory computer-readable carrier and comprising program code instructions for the execution of a method of generating a description file, said description file describing a bitstream, when said program is executed on a computer, and said bitstream being formed by a plurality of fields, wherein said method comprises, performing during reading of said bitstream:

using a description schema, which describes a structure and allows describing a content compliant with a predetermined format and comprises a set of attributes and elements;

assigning at least one value of at least one identified field of said bitstream to at least one variable defined by an attribute of said description schema, called an assignment attribute, said variable being foreign to said description file;

storing said at least one variable;

determining at least one characteristic of at least one element of said description file from an evaluation of a conditional expression relating to said at least one value previously stored in said at least one variable; and generating a portion of said description file as a function of said characteristic or characteristics determined during said determining step.

12. A non-transitory computer-readable carrier comprising a description file stored thereon and software instructions executable by a computer, the description file describing a bitstream, and comprising:

a description of a bitstream from a description schema describing a structure and allowing describing a content compliant with a predetermined format and comprising a set of attributes and elements, said bitstream being having a plurality of fields;

at least one value of at least one identified field of said bitstream assigned to at least one variable defined by an attribute of said description schema, called an assignment attribute, said variable being foreign to said description file, wherein the at least one variable is stored; and the software instructions, when executed by the computer, determine during reading of said bitstream at least one characteristic of at least one element of said description file from an evaluation of a conditional expression relating to said at least one value previously stored in said at least one variable during reading of said bitstream, wherein a portion of said description file is a function of said at least one characteristic.

13. A method for adaptation of scalable multimedia contents, wherein the method comprises, performing during reading of a bitstream:

a phase of generating a description file describing said bitstream from a description schema describing a structure and allowing describing a content compliant with a predetermined format and comprising a set of attributes and elements, said bitstream being formed by a plurality of fields, wherein the phase comprises:

assigning at least one value of at least one identified field of said bitstream to at least one variable defined by an attribute of said description schema, called an assignment attribute, said variable being foreign to said description file;

storing said at least one variable;

determining with a processor at least one characteristic of at least one element of said description file from an evaluation of a conditional expression relating to said at least one value previously stored in said at least one variable; and generating a portion of said description file as a function of said characteristic or characteristics determined during said determining step.

* * * * *

UNITED STATES PATENT AND TRADEMARK OFFICE

CERTIFICATE OF CORRECTION

PATENT NO. : 8,583,815 B2
APPLICATION NO. : 12/294755
DATED : November 12, 2013
INVENTOR(S) : Devillers et al.

It is certified that error appears in the above-identified patent and that said Letters Patent is hereby corrected as shown below:

In the Claims

Column 17:

Claim 12, line 21, delete "being".

Signed and Sealed this
Thirtieth Day of June, 2015

Michelle K. Lee

Michelle K. Lee
*Director of the United States Patent and Trademark Office*

UNITED STATES PATENT AND TRADEMARK OFFICE

CERTIFICATE OF CORRECTION

PATENT NO. : 8,583,815 B2
APPLICATION NO. : 12/294755
DATED : November 12, 2013
INVENTOR(S) : Sylvain Devillers It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 800 days.

Signed and Sealed this
Twenty-second Day of September, 2015

Michelle K. Lee
*Director of the United States Patent and Trademark Office*